H. D. KELLY.
CHOCOLATE URN.
APPLICATION FILED APR. 17, 1914.
1,189,579.
Patented July 4, 1916.
2 SHEETS—SHEET 2.
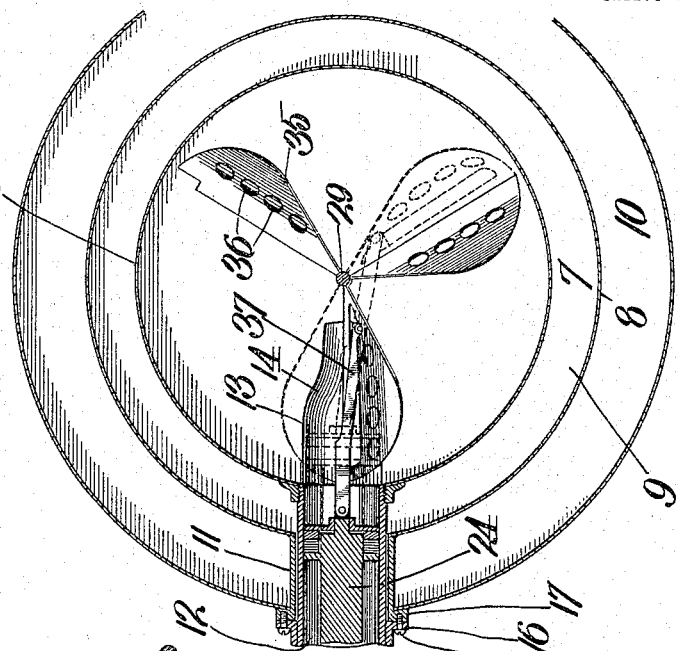
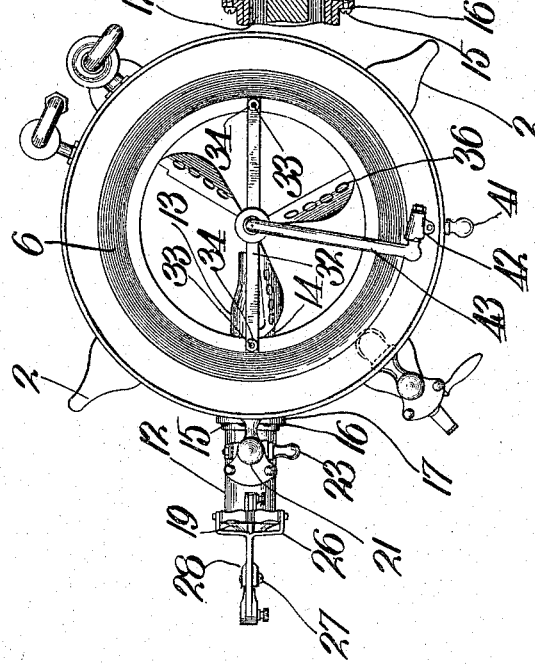
WITNESSES:
Frank R. Glore
H. C. Rodgers
INVENTOR
H. D. Kelly
BY
George H. Thorpe
ATTORNEY

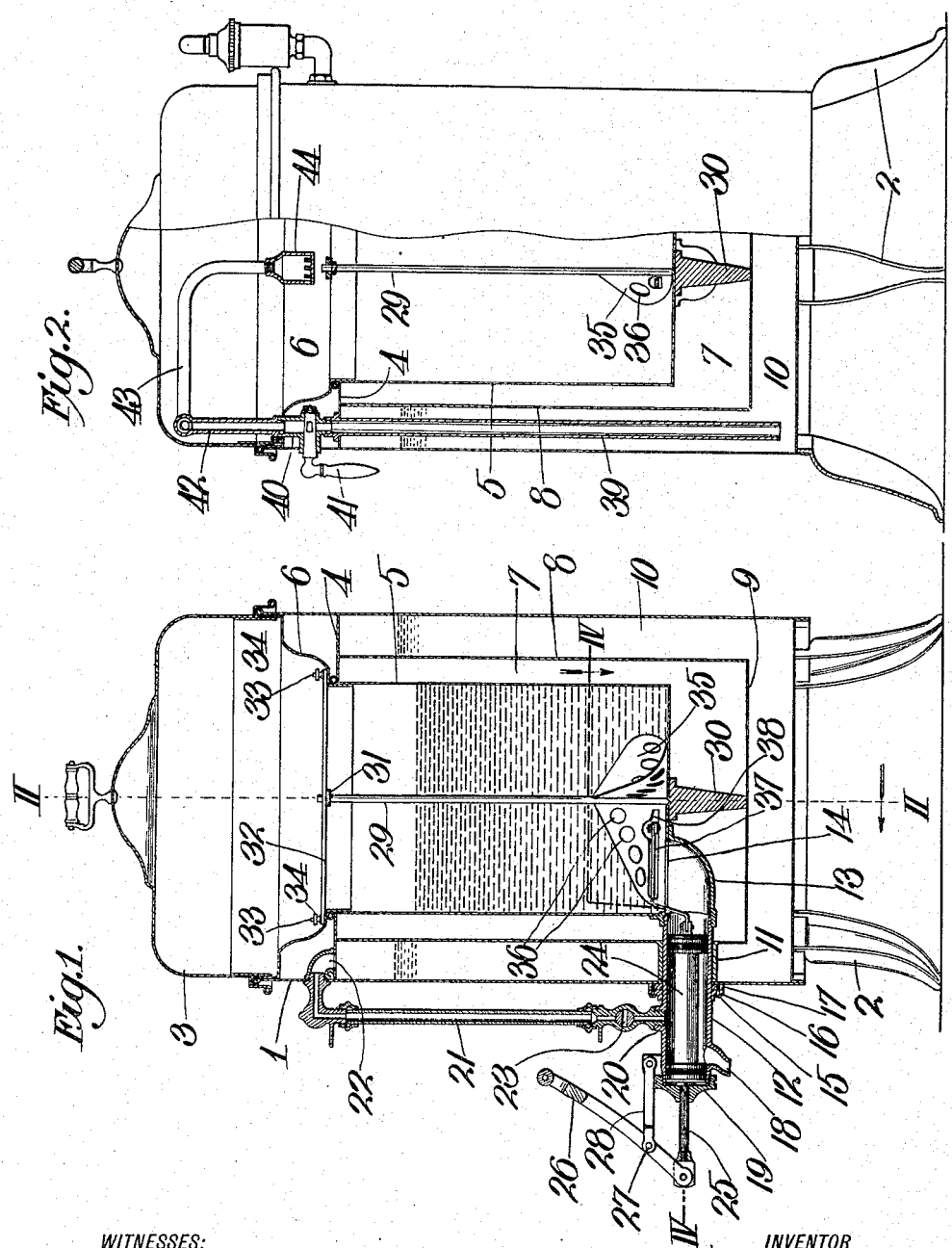

UNITED STATES PATENT OFFICE.

HENRY D. KELLY, OF KANSAS CITY, MISSOURI.

CHOCOLATE-URN.

1,189,579. Specification of Letters Patent. Patented July 4, 1916.

Application filed April 17, 1914. Serial No. 832,654.

*To all whom it may concern:*

Be it known that I, HENRY D. KELLY, a citizen of the United States, residing at Kansas City, in the county of Jackson and State of Missouri, have invented certain new and useful Improvements in Chocolate-Urns, of which the following is a specification.

This invention relates to chocolate urns, and has for its object to produce an urn wherein a beverage such as chocolate can be maintained at a predetermined temperature without danger of being superheated, and in which the operative parts can be thoroughly washed or cleansed and sterilized.

A further object is to produce a chocolate urn having a measuring faucet embodying means for agitating the beverage twice with each delivery by the faucet, for the purpose of effecting a thorough and uniform distribution of the solid part of the chocolate in the liquid part thereof to insure that the beverage shall be of uniform quality and strength irrespective of the quantity in the urn.

With these general objects in view, the invention consists in certain novel and peculiar features of construction and organization as hereinafter described and claimed, and in order that it may be fully understood reference is to be had to the accompanying drawings, in which—

Figure 1, is a central vertical section of a beverage urn embodying my invention. Fig. 2, is a view showing the urn partly in elevation, and partly in vertical section on the line II—II of Fig. 1. Fig. 3, is a top plan view of the urn with the cover or hood omitted. Fig. 4, is an enlarged horizontal section taken on the line IV—IV of Fig. 1.

In the said drawings, 1 is an urn mounted upon legs 2 and provided with the usual cover or hood 3. It is also provided with a horizontal ring 4, through which a chocolate receptacle 5 is suspended as shown, or in any other suitable manner, and with a funnel 6 at the upper end of the receptacle.

To provide an insulating chamber 7 around the receptacle 5 as is common in coffee urns, and thus guard against the possibility of superheating the beverage in the receptacle from direct contact with boiling water and steam in a cylinder hereinafter mentioned, a cylinder 8 is arranged in the urn to receive the receptacle, and said cylinder is closed at its upper end by the ring 4 and at its lower end by a bottom 9, the space exterior to said cylinder forming a water and steam chamber 10. The construction as thus far outlined, is common in coffee urns.

11 is a tube extending across the chamber 10, and receiving and supporting a cylindrical faucet casing 12 which communicates at its inner end with an elbow 13 opening upwardly into the beverage receptacle 5, through an opening 14 in the bottom thereof, and the connection of the faucet with the urn proper is made firm by screw bolts 15 extending through a pair of collars 16 and 17 respectively rigid with the casing 12 and urn 1. The casing is provided with a spout 18 near its outer end, and at such end is closed by a removable cap 19. The casing is also provided with a nipple 20 receiving the lower end of a pipeway 21, which communicates at its upper end through an elbow 22, with the upper end of the chamber 10, and to control the passage of steam into the casing and receptacle, the pipeway is provided with a valve 23.

Fitting slidingly in the casing 12 is a double-headed piston valve 24, the diameter and length of the valve between its heads being the measure of the quantity of chocolate delivered with each operation of the faucet, and to operate the piston valve, it has a rod 25 extending forwardly through the cap 19, for pivotal connection with the lower end of a handle lever 26, fulcrumed at 27, on a link 28 pivoted to the faucet casing to swing in a vertical plane each time the lever is operated, and it will be seen by reference to Fig. 1, that when the lever is pulled forward, the inner head of the piston valve moves into the elbow 13, and the outer head to a point inward of the spout 18, and that most of the solid or undissolved chocolate which may have collected in said elbow or the adjacent end of the casing, is pushed out of the elbow by the said inner head of the valve, it being also obvious that this movement of the valve results in stirring or agitating the beverage so that it will readily take up the solid or undissolved chocolate. It has been found in practice, however, that it is impossible to keep the beverage of uniform strength without providing for a much more effective agitation or stirring than it is possible to accomplish by means of the piston valve, and to effect such thorough agitation the following means are provided: 29 is a vertical shaft journaled at its lower end in the bottom of the receptacle 5, which is preferably provided with an underlying post 30, resting upon the bottom of the cylinder 8, so that the weight of the contents of the receptacle shall be partly sustained by the said cylinder. The upper end of the shaft is provided with a collar or enlargement 31, and is journaled in a cross bar 32 bridging the lower end of and secured to the funnel by bolts 33, and clamping nuts 34 engaging said bolts. The shaft 29 is provided with an agitator 35, consisting of a plurality of blades having horizontal lower edges adapted to lightly scrape the bottom of the receptacle when the shaft is revolved, and said blades are provided with openings 36 through which the beverage can flow while the blades are revolving and thus create counter currents whereby the agitation of the beverage shall be made thorough and effective.

To operate the agitator a link 37 is pivotally connected at one end to the piston valve, and at the other end to one of the blades, and to accommodate the link such blade is preferably provided with a slot 38 and to provide sufficient room for its movement in the elbow 13 without conflict with the same or the bottom of the receptacle, the link is of approximately inverted right-angle form.

When the lever 26 is drawn forward, the link transmits power to the agitator and thereby gives the beverage a preliminary stirring, so that as the inner head of the piston valve enters the elbow 13 the beverage which flows down into the faucet casing will be of proper strength. Immediately the inner or back stroke of the piston is completed the movement of the lever is reversed to effect forward movement of the piston valve and the discharge through the casing spout of a measured quantity of chocolate confined within the faucet between the heads of the piston valve, it being noted that in this reverse action or forward movement of the piston valve, the agitator is returned to its original position and thus coöperates with the first action in effecting an equalization of the strength of the beverage before the faucet is completely charged, and in the continued agitation of the beverage shortly after the measured quantity of the chocolate has been cut off from the supply in the receptacle. It will be understood that in restaurants during the busy hours of the day, this lever will be operated with such frequency ordinarily that the beverage will be in a state of agitation almost continually.

From the foregoing it will be apparent that with each discharge of a measured quantity of chocolate, the beverage is agitated or stirred twice, and that when the beverage is all drawn off from the receptacle, the latter can be thoroughly cleaned by causing steam from the chamber 10 to enter the receptacle from the bottom in a manner hereinbefore explained, and water to be sprayed into the upper end of the receptacle, and to accomplish the last-named function, I employ the customary siphon pipe common in coffee urns of my manufacture. This siphon comprises a pipe 39 which extends vertically through ring 4 nearly to the bottom of the water chamber 10. At its upper end it is connected by a coupling 40 controlled by a valve 41, to the pipe 42, to which is hinged a bent pipe, 43, one arm of said pipe being normally disposed vertically above the center of the receptacle, and secured on the lower end of said pipe is a perforated nozzle 44 for spraying water into the funnel 6 and the receptacle.

If desired the receptacle and funnel and faucet can be thoroughly cleansed by opening valve 41, and thereby utilizing the pressure of the steam in chamber 10 to force water up through pipe 39 and spray nozzle 44 into the funnel and receptacle, the water being drawn off by repeated manipulation of the piston valve 24. For effecting quick and thorough cleansing of the receptacle, it is preferable to disconnect the lever 26 from the link 28, unfasten link 37 from the piston valve, lift the agitator out of the receptacle, and remove the faucet head 19 to permit the piston valve to be withdrawn from the faucet casing. A solid head 45 is then employed to close the outer end of the faucet casing and the spout is plugged in any suitable manner. The operator then opens valves 23 and 41 so that steam may pass from chamber 10 through elbow 22, pipe 21, and the faucet casing and elbow 13, into the lower end of the receptacle, and at the same time water is circulated as hereinbefore described, through the siphon pipe and discharged down into the receptacle from the nozzle 44. By this means the urn is not only thoroughly and efficiently washed but it is at the same time sterilized, and if desired the valve and agitator may be placed in the receptacle for purposes of sterilization. It will thus be seen that this urn can be kept clean, sweet and sanitary with practically no trouble or exertion on the part of the attendant.

The preferred method of making chocolate with this urn is to sterilize milk in receptacle 5. Cocoa and hot water mixed to form a paste, are then added to the sterilized milk and the mixture is boiled in the said receptacle for two or three minutes. Sugar is then added to sweeten the mixture and the latter is then boiled for about two or three minutes, the sterilizing and boiling operations being effected by introducing steam through the manipulation of valve 23, after first adjusting valve 24 so as to open communication between the faucet casing and the interior of the receptacle, and close communication between the pipeway 21 and the spout 18.

From the above description it will be apparent that I have produced a chocolate urn possessing the features of advantage enumerated as desirable, and I wish it to be understood that I reserve the right to make all changes falling within the spirit and scope of the appended claims.

I claim:

1. A beverage urn, provided with a receptacle having a bottom opening, an elbow secured to and underlying the receptacle and communicating with said opening, a faucet casing extending into the urn and communicating at its inner end with said elbow, a measuring valve in said faucet casing, an agitator in the receptacle and a link extending through said bottom opening and pivotally connected at its opposite ends to the valve and the agitator whereby movement imparted to the former will effect operation of the latter.

2. A beverage urn, provided with a receptacle having a bottom opening, an elbow secured to and underlying the receptacle and communicating with said opening, a faucet casing extending into the urn and communicating at its inner end with said elbow, a measuring valve in said faucet casing, a rotary agitator in the receptacle and a bent link pivotally attached at its inner end to the agitator and at its outer or forward end to the piston valve.

3. A beverage urn provided with a chamber for steam and water, a receptacle to contain a beverage, provided with an opening at its lower end, a faucet casing communicating at its inner end with said opening and projecting from the urn, a valve-controlled pipeway leading from the lower end of said steam and water chamber to the uppr end of said receptacle, and means for spraying the water that passes up through said pipeway into said receptacle.

In testimony whereof, I affix my signature, in the presence of two witnesses.

HENRY D. KELLY.

Witnesses:
G. W. DUVALL,
G. Y. THORPE.

Copies of this patent may be obtained for five cents each, by addressing the "Commissioner of Patents, Washington, D. C."